United States Patent
Huang

(10) Patent No.: US 11,386,564 B2
(45) Date of Patent: Jul. 12, 2022

(54) METHOD, SYSTEM, AND COMPUTER-ACCESSIBLE RECORDING MEDIUM FOR MOTION RECOGNITION BASED ON AN ATOMIC POSE

(71) Applicant: Wistron Corporation, New Taipei (TW)

(72) Inventor: Yi-Hsi Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 80 days.

(21) Appl. No.: 16/789,333

(22) Filed: Feb. 12, 2020

(65) Prior Publication Data
US 2021/0133985 A1  May 6, 2021

(30) Foreign Application Priority Data
Nov. 1, 2019  (TW) ................... 108139686

(51) Int. Cl.
  *G06T 7/246* (2017.01)
  *G06T 7/73* (2017.01)
  *G06V 40/20* (2022.01)

(52) U.S. Cl.
  CPC ........... *G06T 7/248* (2017.01); *G06T 7/73* (2017.01); *G06V 40/23* (2022.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 10,913,454 B2* | 2/2021 | Pindeus | G06F 16/29 |
| 2011/0080475 A1* | 4/2011 | Lee | G06K 9/00355 348/77 |
| 2014/0169623 A1* | 6/2014 | Liu | G06K 9/00335 382/103 |
| 2014/0219550 A1* | 8/2014 | Popa | G06K 9/00342 382/154 |
| 2016/0148391 A1* | 5/2016 | Chua | G06K 9/00375 382/103 |

FOREIGN PATENT DOCUMENTS

CN  106022251  10/2016

OTHER PUBLICATIONS

A method of depth image based human action recognition, by Li et al., AIP conference proceedings 1839,020108 (2017) (Year: 2017).*
"Office Action of Taiwan Counterpart Application", dated May 11, 2020, p. 1-p. 5.

(Continued)

*Primary Examiner* — Vikkram Bali
(74) *Attorney, Agent, or Firm* — JCIPRNET

(57) ABSTRACT

A method, a system, and a computer-accessible recording medium for motion recognition based on an atomic pose are provided. A video frame including a live body is obtained. An atomic pose feature value is generated by analyzing the live body in the video frame. A hash value of the atomic pose is generated by executing a hash function according to the atomic pose feature value. The live body executing a specific motion is recognized by comparing the atomic pose hash value.

17 Claims, 5 Drawing Sheets

(56) References Cited

OTHER PUBLICATIONS

Roanna Lun et al., "A Survey of Applications and Human Motion Recognition with Microsoft Kinect", Electrical Engineering & Computer Science Faculty Publications, Aug. 1, 2015, pp. 1-50.
Ronald Poppe, "A survey on vision-based human action recognition", Image and Vision Computing, Jun. 2010, pp. 976-990.
Shih-En Wei et al., "Convolutional Pose Machines", arXiv:1602.00134v4, The Robotics Institute Carnegie Mellon University, Apr. 12, 2016, pp. 1-9.
Ku. Dipti V. Jilhare et al., "Hash Based Block Matching for Motion Estimation", International Journal of Engineering and Technical Research, Jul. 2016, pp. 1-5.
John MacCormick, "How does the Kinect work?", retrieved on Feb. 11, 2020, https://docplayer.net/102893-How-does-the-kinect-work-john-maccormick.html, pp. 1-52.

\* cited by examiner

METHOD, SYSTEM, AND COMPUTER-ACCESSIBLE RECORDING MEDIUM FOR MOTION RECOGNITION BASED ON AN ATOMIC POSE

CROSS-REFERENCE TO RELATED APPLICATION

This application claims the priority benefit of Taiwan application serial no. 108139686, filed on Nov. 1, 2019. The entirety of the above-mentioned patent application is hereby incorporated by reference herein and made a part of this specification.

BACKGROUND

1. Technical Field

The disclosure relates to human body motion recognition, and in particular, to a method, a system, and a computer-accessible recording medium for motion recognition based on an atomic pose.

2. Description of Related Art

Human body motion recognition has always been a popular research and application target in academia and in industry, and may be applied to different fields, such as virtual reality, games, athletic training, health care, home security, user-friendly human-machine interfaces, and education. Currently, human body motion recognition technologies may be divided into two types: a system for human body motion recognition based on computer vision and a system for human body motion recognition based on a wearable sensor. In the system for human body motion recognition based on the wearable sensor, motion recognition may be performed only when a sensor is worn on the human body and cannot be performed for the human body wearing no sensors.

In the system for human body motion recognition based on computer vision, motion recognition may be performed by analyzing an image, and no sensor is required to be worn on the human body. Currently, in such a system, motion recognition may be performed through template comparison or machine learning. Machine learning requires consumption of a significant amount of computing resources, and it is rather time-consuming to establish a machine learning model. In addition, according to template comparison, motion recognition is generally performed through dynamic time warping (DTW) processing. However, due to high time complexity and space complexity, the DTW processing may be hardly applied to an embedded platform with limited computing resources.

SUMMARY

In view of this, the disclosure provides a method, a system, and a computer-accessible recording medium for motion recognition based on an atomic pose, which may effectively reduce computing complexity.

An embodiment of the disclosure provides a method for motion recognition based on an atomic pose, where the method includes following steps: obtaining a video frame including a live body; analyzing the live body in the video frame to generate an atomic pose feature value; executing a hash function according to the atomic pose feature value to generate a hash value of the atomic pose; and recognizing that the human body performs a specific motion by comparing the hash value of the atomic pose.

An embodiment of the disclosure provides a system for motion recognition based on an atomic pose. The system for motion recognition includes a storage apparatus and a processor, and the processor is coupled to the storage apparatus. The processor is configured to perform following steps: obtaining a video frame including a live body; analyzing the live body in the video frame to generate an atomic pose feature value; executing a hash function according to the atomic pose feature value to generate a hash value of the atomic pose; and recognizing that the human body performs a specific motion by comparing the hash value of the atomic pose.

An embodiment of the disclosure provides a computer-accessible recording medium. The computer-accessible recording medium records a computer program, and the computer program is loaded by the processor of the foregoing system for motion recognition to perform the steps in the foregoing method for motion recognition.

To make the aforementioned and other features of the disclosure more comprehensible, several embodiments accompanied with drawings are described in detail as follows.

DESCRIPTION OF THE EMBODIMENTS

Some embodiments of the disclosure will be described in detail below with reference to the accompanying drawings. For component symbols used in the descriptions below, when a same component symbol appears in different accompanying drawings, components represented by the component symbol are considered to be same or similar components. The embodiments are merely a part of the disclosure, and do not disclose all implementations of the disclosure. More specifically, these embodiments are merely examples of a method, a system, and a computer-accessible recording medium in the claims of the disclosure.

Figure 1:
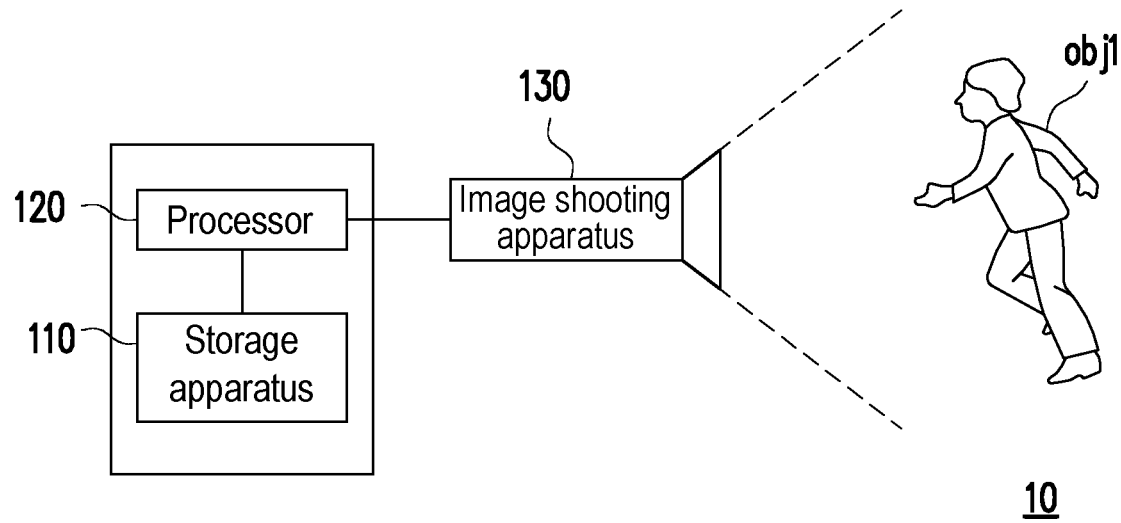
FIG. 1 is a schematic diagram of a system for motion recognition according to an embodiment of the disclosure.

FIG. 1 is a schematic diagram of a system for motion recognition according to an embodiment of the disclosure. However, this is merely for convenience of description, and is not used to limit the disclosure. First, FIG. 1 introduces all components and configuration relationships of the system for motion recognition. Detailed functions and operations are to be disclosed in combination with FIG. 2 and FIG. 3.

Referring to FIG. 1, the system 10 for motion recognition includes a storage apparatus 110, a processor 120, and an image shooting apparatus 130. The processor 120 is coupled to the image shooting apparatus 130 and the storage apparatus 110. In an embodiment, the system 10 for motion recognition may include a computer system having the storage apparatus 110 and the processor 120, and the image shooting apparatus 130 externally connected to the foregoing computer system. For example, the system 10 for motion recognition may include a notebook computer or a desktop computer and a peripheral camera, and the disclosure is not limited herein. In another embodiment, the system 10 for motion recognition may be a single electronic apparatus integrating the image shooting apparatus 130, the storage apparatus 110, and the processor 120. For example, the system 10 for motion recognition may be an electronic apparatus having an image capturing function, such as a smartphone or a tablet computer. The disclosure is not limited herein.

The image shooting apparatus 130 is configured to capture an image toward a space to generate a video stream including continuous video frames, and includes a camera lens having a lens and a photosensitive component. The photosensitive component is configured to sense intensity of a light entering the lens, to generate an image. The photosensitive component may be, for example, a charge coupled device (CCD), a complementary metal-oxide semiconductor (CMOS) component, or another component. The disclosure is not limited herein. Specifically, the image shooting apparatus 130 may be a depth camera, a stereoscopic camera, or a red-green-blue (RGB) camera. This is not limited in the disclosure.

The storage apparatus 110 is configured to store data such as an image, program code, a software component. The storage apparatus 110 may be, for example, a fixed or removable random access memory (RAM) of any type, a read-only memory (ROM), a flash memory, a hard disk, or other similar apparatuses, integrated circuit, or a combination thereof.

The processor 120 is configured to control actuation between components of the system 10 for motion recognition. The processor 120 is, for example, a central processing unit (CPU), another programmable microprocessor with a general purpose or a specific purpose, a digital signal processor (DSP), a programmable controller, an application specific integrated circuit (ASIC), a programmable logic device (PLD), a graphics processing unit (GPU), or other similar apparatuses or a combination of the apparatuses. The processor 120 may execute the program code, a software module, an instruction, and the like that are recorded in the storage apparatus 110, to implement the method for motion recognition in the present embodiment of the disclosure.

Figure 2:
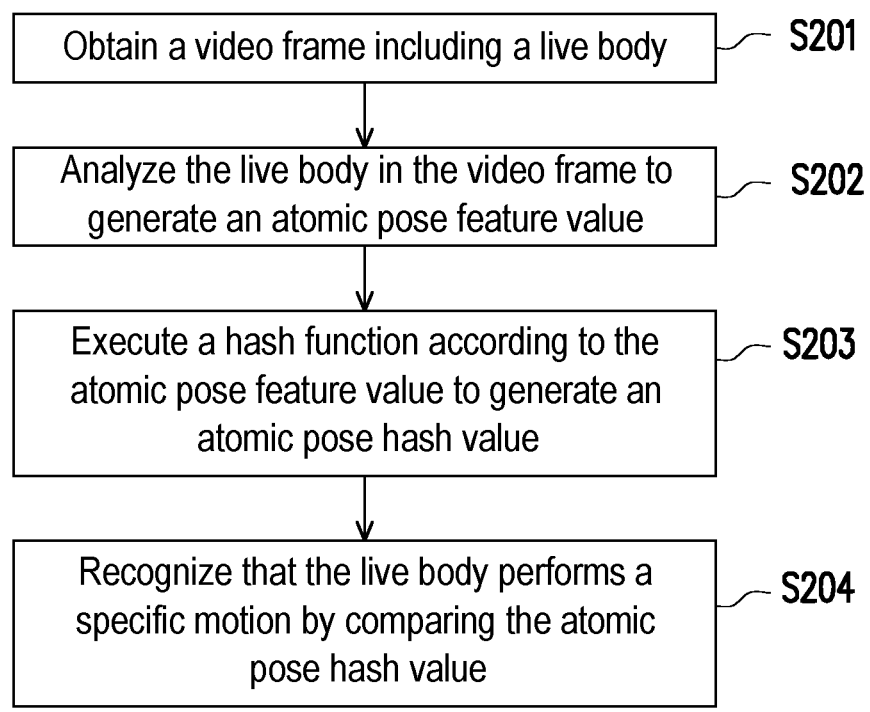
FIG. 2 is a flowchart of a method for motion recognition according to an embodiment of the disclosure.

FIG. 2 is a flowchart of a method for motion recognition according to an embodiment of the disclosure. Referring to FIG. 2, the method in the present embodiment is applicable to the system 10 for motion recognition in FIG. 1. A detailed process of the method in the present embodiment is described below in combination with the components in the system 10 for motion recognition. The system 10 for motion recognition may be configured to recognize a dynamic specific motion performed by a live body, and the live body may be a human body or other animals. This is not limited in the disclosure. However, for convenience of description, a description is provided below by using an example in which the live body is a human body.

First, in step S201, the processor 120 obtains a video frame including the live body. To be specific, the image shooting apparatus 130 keeps shooting toward a space, to generate a video stream, and at least one object Obj1 is located in the space. The video stream includes a plurality of video frames that are respectively corresponding to different shooting time points, so that the video frames respectively include a human body corresponding to the object Obj1. The image shooting apparatus 130 provides the video stream to the computer system including the processor 120 and the storage apparatus 110. A dynamic motion of the object Obj1 in the space may be recognized by analyzing the video frames in the video stream by the processor 120.

In step S202, the processor 120 analyzes the live body in the video frame to generate an atomic pose feature value. In this way, the term "atomic pose" represents a pose presented by a human body in a single video frame. To be specific, the processor 120 may execute a pose detection software kit to obtain an atomic pose feature value of the atomic pose presented by the human body in the video frame. The atomic pose feature value may include limb angle information, and the limb angle information is, for example, skeletal information of the human body or extension information generated based on the skeletal information. The pose detection software kit is, for example, Nuitra SDK, MS Kinect, Orbbec Astra SDK, OpenPose, or PoseNet. This is not limited in the disclosure.

In step S203, the processor 120 executes a hash function according to the atomic pose feature value to generate a hash value of the atomic pose. The hash function is one kind of one-way data conversion operations that may convert the atomic pose feature value into a character string (namely, a hash value) including letters and numbers. The hash function may be MD5, RIPEMD-160, SHA1, SHA386, SHA512, or other suitable functions. This is not limited in the disclosure. In other words, after analyzing the atomic pose feature values of the atomic poses in the video frames, the processor 120 may obtain corresponding hash values of the atomic poses according to the hash function. In addition, in an embodiment, the processor 120 may further input timestamps of the video frames and the limb angle information of the atomic poses together into the hash function to generate the corresponding hash values of the atomic poses.

Figure 3:
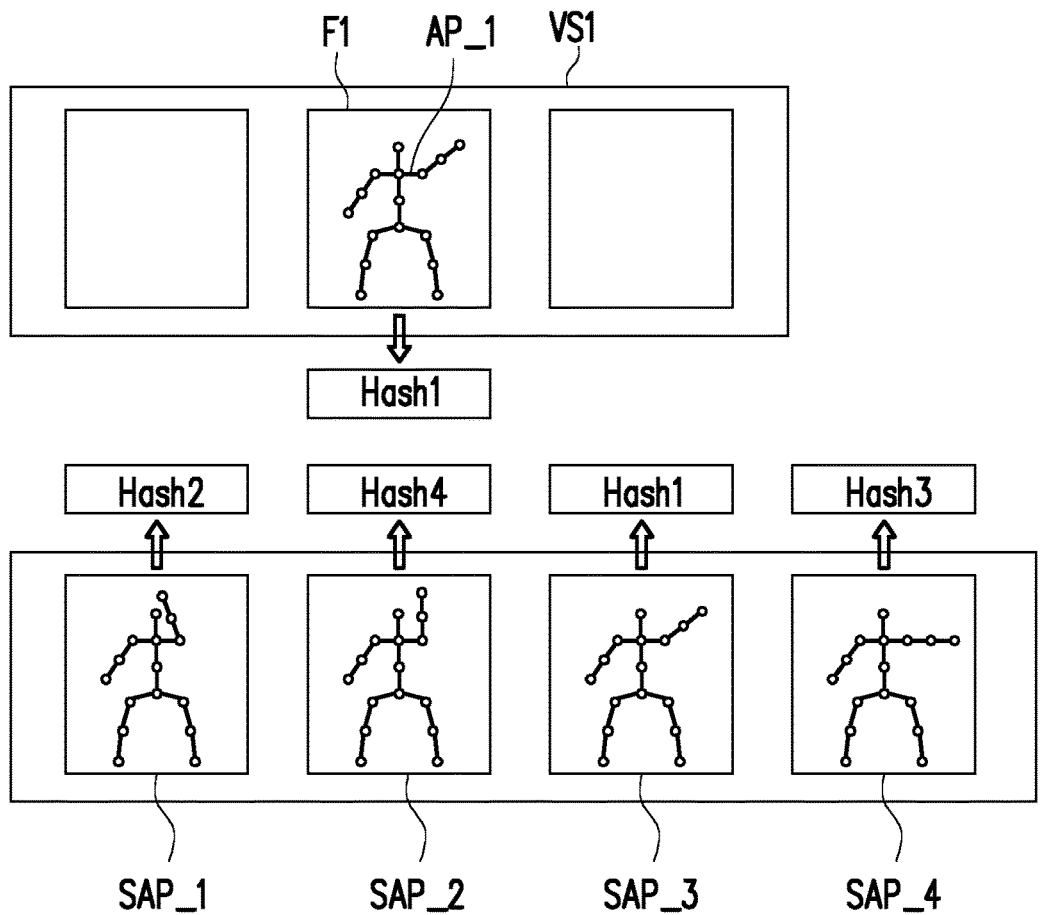
FIG. 3 is a schematic diagram of a method for motion recognition according to an embodiment of the disclosure.

In step S204, the processor 120 recognizes that the human body performs a specific motion by comparing the hash value of the atomic pose. In an embodiment, when it is determined, according to the hash values of the atomic poses, that the atomic pose in the video frame conforms to one of a plurality of standard atomic poses of the specific motion, the processor 120 may recognize that the human body performs the specific motion. To be specific, the processor 120 may search a hash table according to a currently detected hash value of the atomic pose, and determines, according to whether a same hash value is recorded in the hash table, whether the atomic pose conforms to one of the plurality of standard atomic poses of the specific motion. More specifically, FIG. 3 is a schematic diagram of a method for motion recognition according to an embodiment of the disclosure. Referring to FIG. 3, a dynamic specific motion (for example, waving an arm) may be defined based on standard atomic poses SAP_1, SAP_2, SAP_3, and SAP_4. Hash values Hash2, Hash4, Hash1, and Hash3 that are respectively corresponding to the standard atomic poses SAP_1, SAP_2, SAP_3, and SAP_4 are recorded in a hash table stored in the storage apparatus 110. When analyzing a video frame F1, the processor 120 may obtain the hash value Hash1 of an atomic pose AP_1. The processor 120 may search the hash table according to the hash value Hash1 of the atomic pose AP_1, and determine that the hash value Hash1 of the atomic pose AP_1 is identical to the hash value Hash1 of the standard atomic pose SAP_3. Therefore, the processor 120 may recognize, by continuously determining whether a plurality of atomic poses in consecutive video frames in a video stream VS1 conforms to the plurality of standard atomic poses SAP_1, SAP_2, SAP_3, and SAP_4 of the specific motion, whether the human body performs the specific motion, to achieve motion recognition. In addition, the processor 120 determines whether an atomic pose conforms to a standard atomic pose of a specific motion by comparing a hash value of the atomic pose with a hash table created before the operation. Therefore, computing complexity may be effectively reduced compared with DTW processing.

Figure 4:
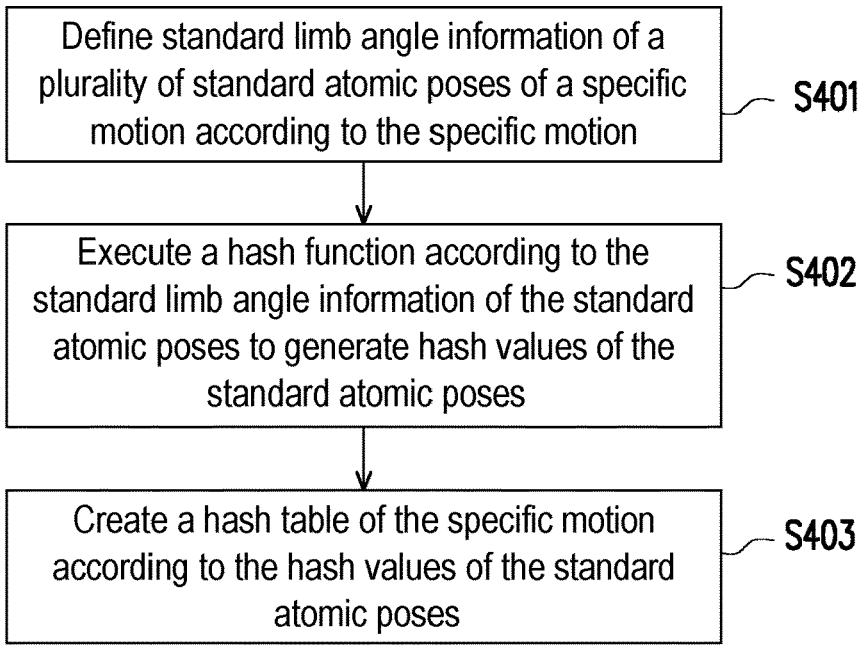
FIG. 4 is a flowchart for creating a hash table according to an embodiment of the disclosure.

It may be learned that in an embodiment, before actually performing motion recognition, the processor 120 needs to create a hash table of a specific motion. FIG. 4 is a flowchart for creating a hash table according to an embodiment of the disclosure. Referring to FIG. 4, the method in the present embodiment is applicable to the system 10 for motion recognition in FIG. 1. A specific process of the method in the present embodiment is described below in combination with the components in the system 10 for motion recognition.

In step S401, the processor 120 defines standard limb angle information of a plurality of standard atomic poses of a specific motion according to the specific motion. Specifically, according to a type and a motion feature of the specific motion, the processor 120 may define the standard limb angle information of the plurality of standard atomic poses. For example, assuming that the specific motion is that two legs alternately lift and two arms naturally swing during walking, the standard atomic poses may be respectively defined as "slightly lifting the right leg", "lifting the right leg up", "slightly lifting the left leg", and "lifting the left leg up". Correspondingly, the processor 120 may generate standard limb angle information for the standard atomic poses respectively, for example, a knee-joint angle of the two legs and an elbow-joint angle of the two arms. However, definitions of a standard atomic pose and standard limb angle information of the standard atomic pose may be designed according to an actual application. This is not limited in the disclosure. In addition, a quantity of standard atomic poses corresponding to a same specific motion may also be designed according to an actual application. This is not limited in the disclosure. It should be noted that a manner of generating standard limb angle information in step S401 is identical to a manner of generating limb angle information in step S202.

Subsequently, in step S402, the processor 120 executes a hash function according to the standard limb angle information of the standard atomic poses to generate hash values of the standard atomic poses. In step S403, the processor 120 creates a hash table of the specific motion according to the hash values of the standard atomic poses. In other words, different specific motions respectively have different corresponding hash tables, and the hash tables may be recorded in the storage apparatus 110. Then, the processor 120 may determine, according to the hash tables, a specific motion performed by a human body in a video stream.

Figure 5:
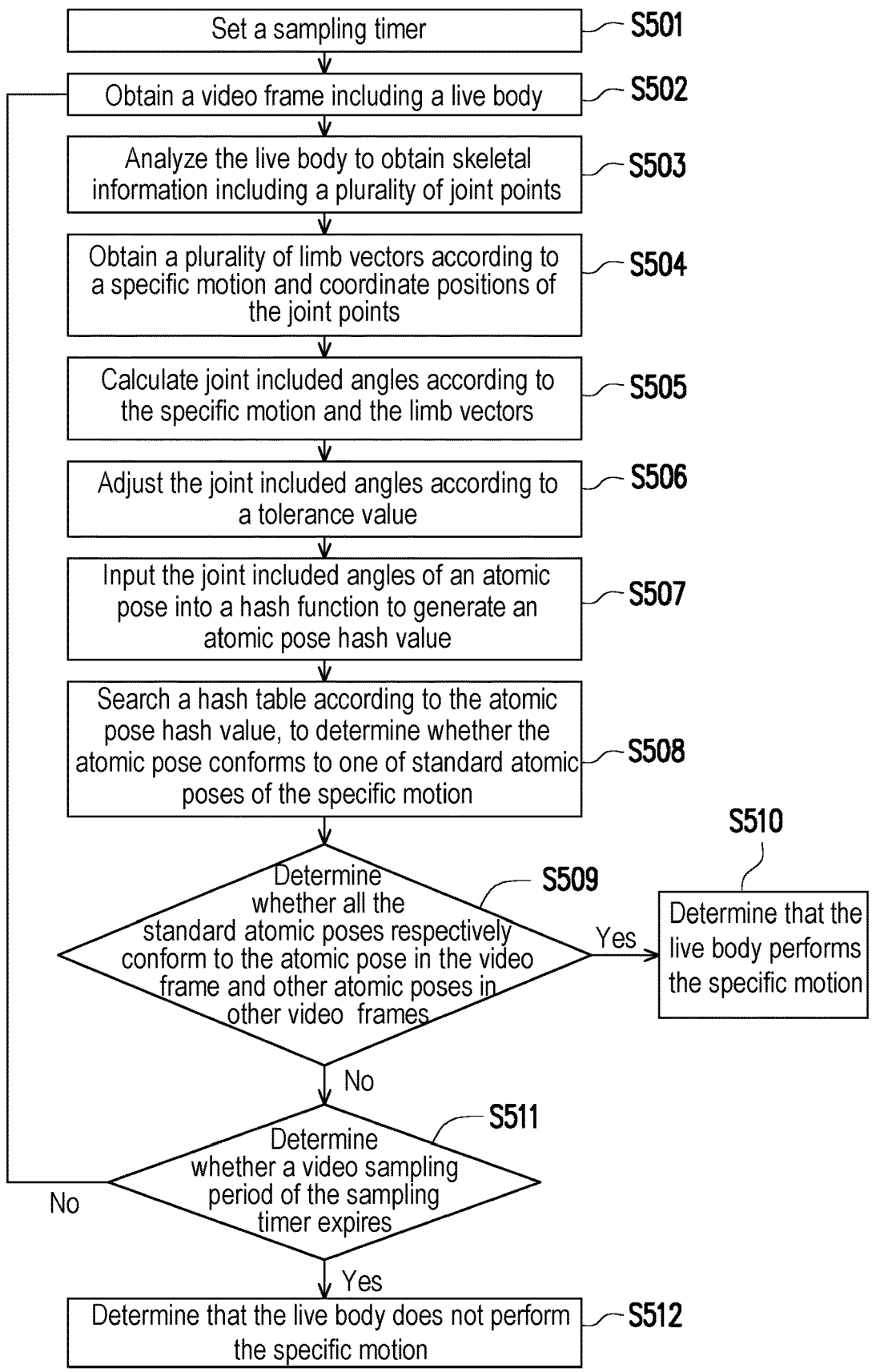
FIG. 5 is a flowchart of a method for motion recognition according to an embodiment of the disclosure.

However, the implementations of the disclosure are not limited to the foregoing descriptions, and content of the foregoing embodiments may be appropriately modified of extended for an actual requirement. For clearer description, embodiments are listed below in combination with the components of the system 10 for motion recognition in FIG. 1, to describe detailed steps of the method for motion recognition performed by the system 10 for motion recognition. FIG. 5 is a flowchart of a method for motion recognition according to an embodiment of the disclosure. Refer to both FIG. 1 and FIG. 5.

In step S501, the processor 120 sets a sampling timer. In an embodiment, the processor 120 determines, according to a plurality of video frames in a video sampling period, whether a live body performs a specific motion. In other words, the processor 120 re-recognizes an action of the live body at an interval of a video sampling period. A length of the video sampling period may be preset to be, for example, 2 seconds. This is not limited in the disclosure. The processor 120 measures the video sampling period by using the sampling timer. The timer may be a software counter. For example, the image shooting apparatus 130 may capture 60 video frames per second. If the video sampling period is 2 seconds, the processor 120 may determine whether the sampling timer expires by counting a frame number of the video frames. When the timer counts up to 120 frames, it indicates that the sampling timer expires. Alternatively, the processor 120 may determine, according to timestamps corresponding to the video frames, whether the sampling timer expires.

In step S502, the processor 120 obtains a video frame including the live body in a video stream. In the present embodiment, limb angle information of the live body may include a plurality of joint included angles. Therefore, in step S3503, the processor 120 analyzes the live body to obtain skeletal information including a plurality of joint points. A quantity of the joint points is not limited in the disclosure, and may be set according to an actual application. Specifically, the skeletal information of the live body includes the plurality of joint points (or referred to as key points). The joint points respectively have corresponding coordinate positions. The coordinate position may be a two-dimensional coordinate or a three-dimensional coordinate. In an embodiment, when the image shooting apparatus 130 is a depth camera or a stereoscopic camera, the processor 120 may obtain three-dimensional coordinates of the joint points according to images that are captured by the depth camera or the stereoscopic camera and by using a pose detection software kit such as Nuitra SDK, MS Kinect, or Orbbec Astra SDK.

In step S504, the processor 120 obtains a plurality of limb vectors according to the specific motion and the coordinate positions of the joint points. Specifically, the processor 120 may calculate a limb vector according to coordinate positions of two joint points. For example, when the live body is a human body, the processor 120 may calculate a limb vector from a shoulder joint point to an elbow joint point. In step S505, the processor 120 calculates joint included angles according to the specific motion and the limb vectors. The processor 120 may calculate an included angle between two limb vectors. Specifically, the processor 120 may calculate a joint included angle between a first limb vector and a second limb vector. An end point of the first limb vector is a starting point of the second limb vector. It should be noted that the processor 120 may calculate a corresponding limb vector and a corresponding joint included angle according to a type of the specific motion. That is, the processor 120 should obtain limb vectors and joint included angles based on the type of the specific motion. For example, it is assumed that the live body is a human body, the specific motion is walking, and the processor 120 needs to obtain knee joint included angles of two legs and elbow joint included angles of two arms. Therefore, the processor 120 needs to obtain limb vectors that are used to calculate the knee joint included angles and the elbow joint included angles.

Figure 6:
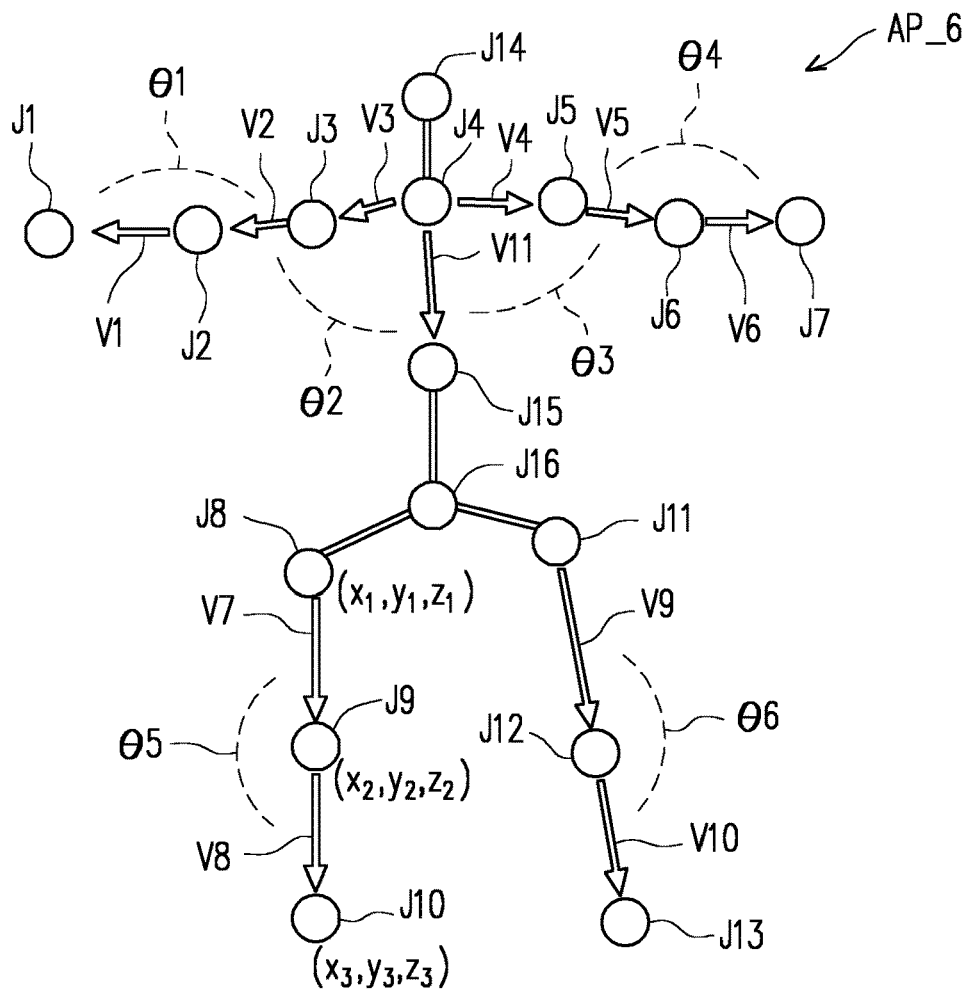
FIG. 6 is a schematic diagram of calculating a joint included angle according to an embodiment of the disclosure.

FIG. 6 is a schematic diagram of calculating a joint included angle according to an embodiment of the disclosure. Referring to FIG. 6, for example, the live body is a human body. For an atomic pose AP_6 in a video frame, the processor 120 may obtain skeletal information including joint points J1 to J16. Assuming that the processor 120 intends to determine whether the atomic pose AP_6 is a T pose of performing side lateral raise with two arms, the processor 120 calculates an elbow joint included angle θ1, an elbow joint included angle θ4, a shoulder joint included angle θ2, a shoulder joint included angle θ3, a knee joint included angle θ5, and a knee joint included angle θ6.

Specifically, the processor 120 calculates a limb vector V7 according to the joint points J8 and J9, and calculates a limb vector V8 according to the joint points J9 and J10. Subsequently, the processor 120 may calculate an included angle between the limb vector V7 and the limb vector V8 to obtain the knee joint included angle θ5 of the left leg. More specifically, assuming that the joint points J8, J9, and J10 are respectively $(x_1, y_1, z_1)$, $(x_2, y_2, z_2)$, and $(x_3, y_3, z_3)$, the limb vector V7 is $(x_2-x_1, y_2-y_1, z_2-z_1)$ and the limb vector V8 is $(x_3-x_2, y_3-y_2, z_3-z_2)$. Similarly, the processor 120 calculates the limb vector V7 according to the joint points J8 and J9, and calculates the limb vector V8 according to the joint points J9 and J10. Subsequently, the processor 120 may calculate the included angle between the limb vector V7 and the limb vector V8 to obtain the knee joint included angle θ5 of the left leg.

In addition, the processor 120 calculates a limb vector V1 according to the joint points J1 and J2, and calculates a limb vector V2 according to the joint points J3 and J2. Subsequently, the processor 120 may calculate an included angle between the limb vector V1 and the limb vector V2 to obtain the elbow joint included angle θ1 of the right arm. The processor 120 may calculate a limb vector V3 according to the joint points J3 and J4, and calculates a limb vector V11 according to the joint points J4 and J15. Subsequently, the processor 120 may calculate an included angle between the limb vector V3 and the limb vector V11 to obtain the right shoulder joint included angle θ2. Similarly, the processor 120 calculates a limb vector V6 according to the joint points J6 and J7, and calculates a limb vector V5 according to the joint points J5 and J6. Subsequently, the processor 120 may calculate an included angle between the limb vector V5 and the limb vector V6 to obtain the elbow joint included angle θ4 of the left arm. The processor 120 may calculate a limb vector V4 according to the joint points J5 and J4, and calculate a limb vector V11 according to the joint points J4 and J15. Subsequently, the processor 120 may calculate an included angle between the limb vector V4 and the limb vector V11 to obtain the left shoulder joint included angle θ3. Therefore, in an embodiment, the elbow joint included angle θ1, the elbow joint included angle θ4, the shoulder joint included angle θ2, the shoulder joint included angle θ3, the knee joint included angle θ5, and the knee joint included angle θ6 may be subsequently used to generate a hash value of the atomic pose AP_6.

Return to the process in FIG. 5. In step S506, the processor 120 adjusts the joint included angles according to a tolerance value. The tolerance value is, for example, 5 degrees or 10 degrees, and this is not limited in the disclosure. Specifically, if a difference between a currently detected joint included angle and a standard joint included angle of a standard atomic pose is less than the tolerance value, the currently detected joint included angle may be directly adjusted to be identical to the standard joint included angle. That is, the currently detected joint included angle is directly considered as the standard joint included angle to perform a subsequent process.

Figure 7:
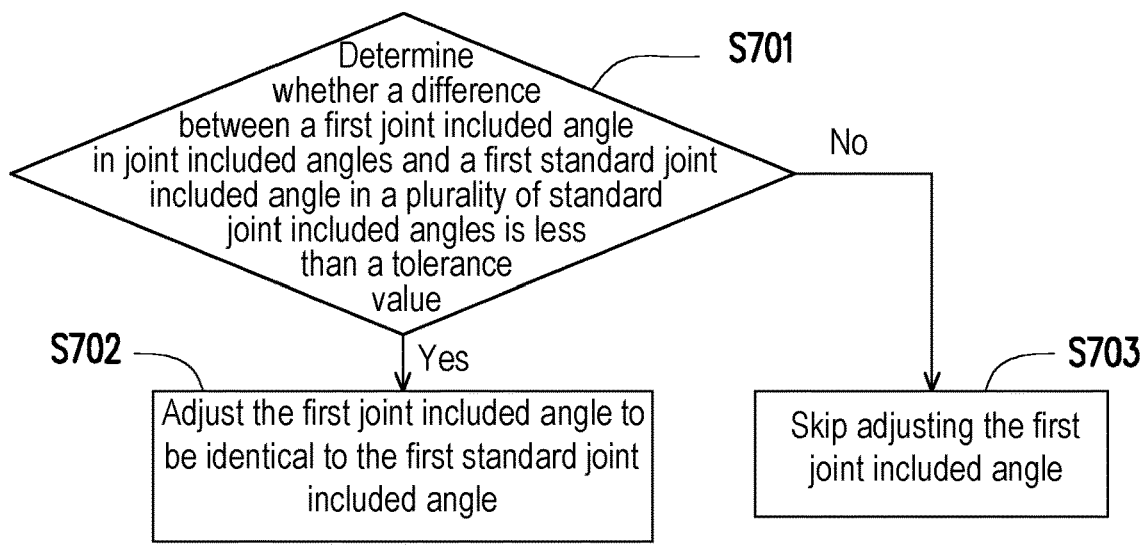
FIG. 7 is a flowchart for adjusting a joint included angle according to an embodiment of the disclosure.

FIG. 7 is a flowchart for adjusting a joint included angle according to an embodiment of the disclosure. Referring to the drawing, in step S701, the processor 120 determines whether a difference between a first joint included angle of joint included angles and a first standard joint included angle of a plurality of standard joint included angles is less than a tolerance value. If it is determined to be "yes" in step S701, in step S702, in response to a case in which the difference between the first joint included angle of the joint included angles and the first standard joint included angle of the standard joint included angles is less than the tolerance value, the processor 120 adjusts the first joint included angle to be identical to the first standard joint included angle. On the contrary, if it is determined to be "no" in step S701, in step S703, the processor 120 skips adjusting the first joint included angle. For example, the live body is a human body. Assuming that the tolerance value is 5 degrees and a knee joint included angle obtained by the processor 120 according to skeletal information is 178 degrees, the processor 120 may adjust the knee joint included angle to be a standard joint included angle of 180 degrees. On the contrary, assuming that the tolerance value is 5 degrees and a knee joint included angle obtained by the processor 120 according to skeletal information is 170 degrees, the processor 120 may skip adjusting the knee joint included angle, but maintain the knee joint included angle at 170 degrees.

Return to the process in FIG. 5. In step S507, the processor 120 inputs the joint included angles of the atomic pose into a hash function to generate a hash value of the atomic pose. Specifically, the processor 120 may connect the joint included angles in series to generate a numeric string, and input the numeric string into the hash function to generate the hash value of the atomic pose. However, the disclosure is not limited thereto. The processor 120 may alternatively perform other preprocessing on the joint included angles to generate input data, and input the input data into the hash function to generate the hash value of the atomic pose.

In step S508, the processor 120 searches a hash table according to the hash value of the atomic pose, to determine whether the atomic pose conforms to one of the standard atomic poses of the specific motion. Specifically, the processor 120 searches the hash table according to the hash value of the atomic pose, to determine whether the hash value of the atomic pose is identical to one of hash values in the hash table that are respectively corresponding to the plurality of standard atomic poses. In response to a case in which the hash value of the atomic pose is identical to one of the hash values in the hash table that are respectively corresponding to the standard atomic poses, the processor 120 may determine that the atomic pose conforms to one of the standard atomic poses of the specific motion.

In step S509, the processor 120 determines whether all the standard atomic poses respectively conform to the atomic pose in the video frame and other atomic poses in other video frames. Specifically, the specific motion is defined according to a plurality of standard atomic poses. Therefore, in an embodiment, the processor 120 determines, in a video sampling period, whether atomic poses conforming to all the standard atomic poses are detected, to determine whether the live body performs the specific motion.

Therefore, if it is determined to be "yes" in step S509, in step S510, in response to a case in which all the standard atomic poses respectively conform to the atomic pose in the video frame and other atomic poses in other video frames, the processor 120 may determine that the live body performs the specific motion. If it is determined to be "no" in step S509, in step S511, the processor 120 determines whether the video sampling period of the sampling timer expires. If it is determined to be "no" in step S511, return to step S502. The processor 120 continues to determine whether an atomic pose in a next video frame conforms to a standard atomic pose of the specific motion. If it is determined to be "yes" in step S511, in step S512, in response to a case in which the video sampling period of the sampling timer expires, the processor 120 determines that the live body does not perform the specific motion.

Figure 8:
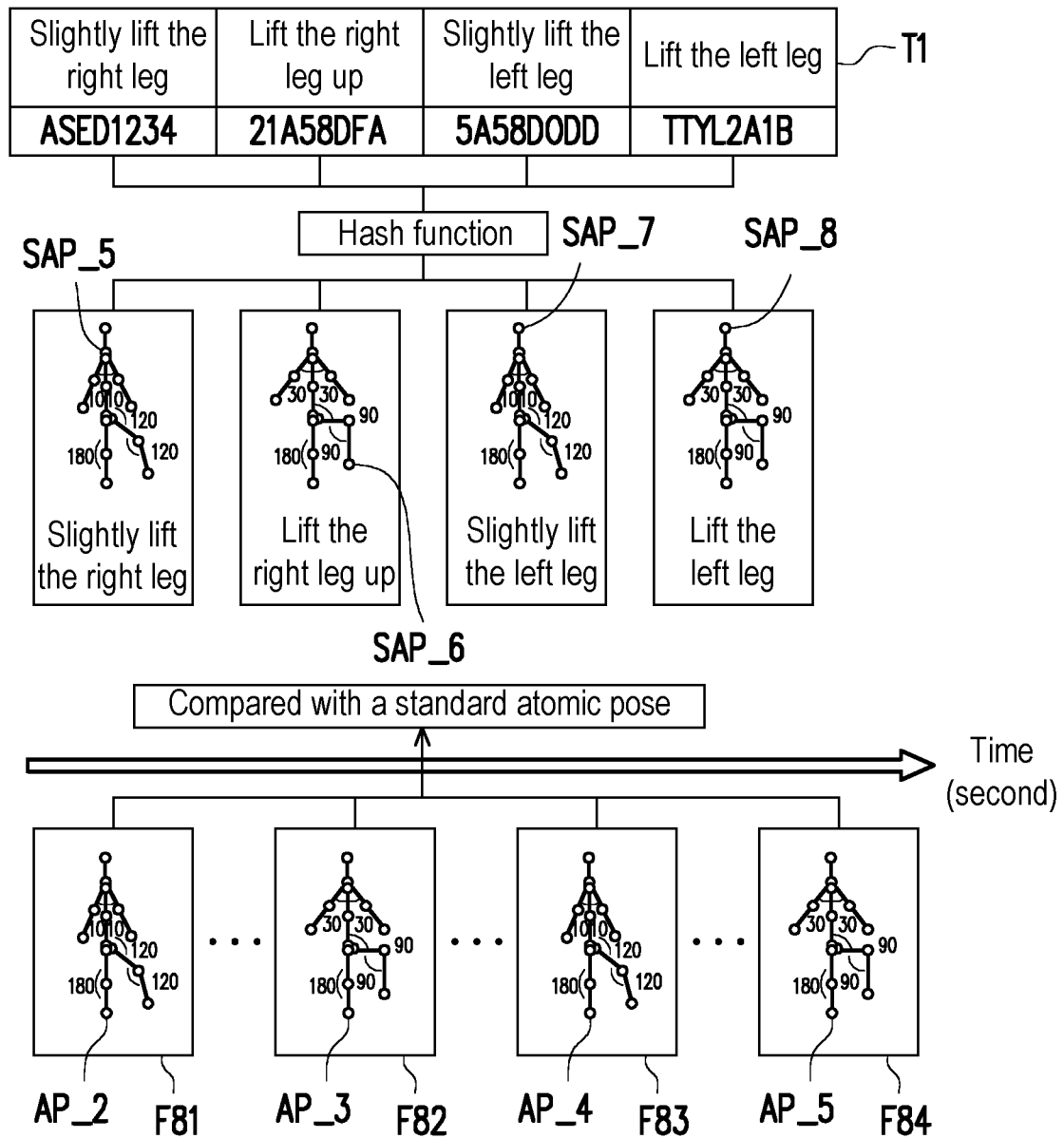
FIG. 8 is a schematic diagram of a method for motion recognition according to an embodiment of the disclosure.

For example, FIG. 8 is a schematic diagram of a method for motion recognition according to an embodiment of the disclosure. Referring to FIG. 8, the live body is a human body. In FIG. 8, an example in which the specific motion is walking and the specific motion is defined by four standard atomic poses is used for description. However, the disclosure is not limited thereto. In the present example, the processor 120 first creates a hash table T1 of the specific motion "walking". The processor 120 may first define standard limb angle information of each of standard atomic poses SAP_5 to SAP_8. In the present example, the standard limb angle information is a standard joint included angle. The processor 120 may define standard joint included angles of each of the standard atomic poses SAP_5 to SAP_8 (which are respectively "slightly lifting the right leg", "lifting the right leg up", "slightly lifting the left leg", and "lifting the left leg up"). For example, standard joint included angles of the standard atomic pose SAP_5 "slightly lifting the right leg" include: a left knee joint included angle of 180 degrees, a right knee joint included angle of 120 degrees, a right shoulder joint included angle of 10 degrees, a left shoulder joint included angle of 10 degrees, and a right hip joint included angle of 120 degrees.

Then, the processor 120 may generate corresponding hash values according to the standard joint included angles of each of the standard atomic poses SAP_5 to SAP_8, and record the hash values as the hash table T1. As shown in FIG. 8, the hash table T1 records a hash value "ASED1234" corresponding to the standard atomic pose SAP_5, a hash value "21A58DFA" corresponding to the standard atomic pose SAP_6, a hash value "5A58D0DD" corresponding to the standard atomic pose SAP_7, and a hash value "TTYL2A1B" corresponding to the standard atomic pose SAP_8.

When actually performing motion recognition, the processor 120 may generate a hash value corresponding to an atomic pose AP_2 in a video frame F81 of a first time. In response to a case in which the hash value of the atomic pose AP_2 is identical to the hash value "ASED1234" in the hash table T1, the processor 120 may determine that the atomic pose AP_2 conforms to the standard atomic pose SAP_5. Subsequently, the processor 120 may generate a hash value corresponding to an atomic pose AP_3 in a video frame F82 of a second time. In response to a case in which the hash value of the atomic pose AP_3 is identical to the hash value "21A58DFA" in the hash table T1, the processor 120 may determine that the atomic pose AP_3 conforms to the standard atomic pose SAP_6.

Subsequently, the processor 120 may generate a hash value corresponding to an atomic pose AP_4 in a video frame F83 of a third time. In response to a case in which the hash value of the atomic pose AP_4 is identical to the hash value "5A58D0DD" in the hash table T1, the processor 120 may determine that the atomic pose AP_4 conforms to the standard atomic pose SAP_7. The processor 120 may generate a hash value corresponding to an atomic pose AP_5 on a video frame F84 of a fourth time. In response to a case in which the hash value of the atomic pose AP_5 is identical to the hash value "TTYL2A1B" in the hash table T1, the processor 120 may determine that the atomic pose AP_5 conforms to the standard atomic pose SAP_8. Therefore, in response to a case in which all the standard atomic poses SAP_5 to SAP_8 of the specific motion respectively conform to the atomic poses AP_2 to AP_5, the processor 120 may determine that the human body performs the specific motion "walking", thereby achieving human body motion recognition.

An embodiment of the disclosure further provides a non-transitory computer-accessible medium. The computer-accessible medium may store a plurality of code segments, and after the code segments are loaded in the processor 120 in the system 10 for motion recognition and executed, the steps in the foregoing method for motion recognition may be completed.

Based on the above, in the embodiments of the disclosure, the system for motion recognition may obtain atomic pose feature values presented by a human body in video frames, and generate hash values of the atomic poses in the video frames according to the atomic pose feature values and a hash function. Whether the live body performs a dynamic specific motion may be determined by comparing the hash values of the atomic poses in the video frames with the hash table related the specific motion. This may greatly reduce computing complexity, thereby extending an application range of live body motion recognition. In addition, compared with a case of storing massive image template information to perform pose template comparison to complete motion recognition, in the embodiments of the disclosure, only a hash table needs to be stored, thereby effectively saving storage space. That is, the embodiments of the disclosure may provide a motion recognition solution that has low computing complexity and saves storage space, so that the motion recognition solution may be applied to an embedded platform with limited computing resources and hardware resources.

Although the disclosure has been described with reference to the above embodiments, the embodiments are not intended to limit the disclosure. A person of ordinary skill in the art may make variations and improvements without departing from the spirit and scope of the disclosure. In view of the foregoing, it is intended that the disclosure covers modifications and variations provided that they fall within the scope of the following claims and their equivalents.

What is claimed is:

1. A method for motion recognition based on an atomic pose, wherein the method comprises:
   obtaining a video frame comprising a live body;
   analyzing the live body in the video frame to generate an atomic pose feature value;
   executing a hash function according to the atomic pose feature value to generate a hash value of the atomic pose; and
   recognizing that the live body performs a specific motion by comparing the hash value of the atomic pose with a hash table related to the specific motion,
   wherein the step of analyzing the live body in the video frame to generate the atomic pose feature value comprises:
   analyzing the live body in the video frame to generate limb angle information of the atomic pose, wherein the step of recognizing that the live body performs the specific motion by comparing the hash value of the atomic pose comprises:
recognizing that the live body performs the specific motion when it is determined, according to the hash value of the atomic pose, that the atomic pose conforms to one of a plurality of standard atomic poses of the specific motion.

2. The method for motion recognition according to claim 1, wherein the step of analyzing the live body in the video frame to generate the limb angle information of the atomic pose comprises:
analyzing the live body to obtain skeletal information comprising a plurality of joint points;
obtaining a plurality of limb vectors according to the specific motion and coordinate positions of the joint points; and
calculating a plurality of joint included angles according to the specific motion and the limb vectors.

3. The method for motion recognition according to claim 2, wherein the step of executing the hash function according to the limb angle information to generate the hash value of the atomic pose comprises:
adjusting the joint included angles according to a tolerance value; and
inputting the joint included angles of the atomic pose into the hash function to generate the hash value of the atomic pose.

4. The method for motion recognition according to claim 3, wherein the step of adjusting the joint included angles according to the tolerance value comprises:
in response to a case in which a difference between a first joint included angle of the joint included angles and a first standard joint included angle of a plurality of standard joint included angles is less than the tolerance value, adjusting the first joint included angle to be identical to the first standard joint included angle.

5. The method for motion recognition according to claim 1, wherein the method further comprises:
defining standard limb angle information of the standard atomic poses of the specific motion according to the specific motion;
executing the hash function according to the standard limb angle information of the standard atomic poses to generate hash values of the standard atomic poses; and
creating the hash table of the specific motion according to the hash values of the standard atomic poses.

6. The method for motion recognition according to claim 5, wherein the step of recognizing that the live body performs the specific motion when it is determined, according to the hash value of the atomic pose, that the atomic pose conforms to one of the standard atomic poses of the specific motion comprises:
searching the hash table according to the hash value of the atomic pose to determine whether the hash value of the atomic pose is identical to one of the hash values in the hash table which are respectively corresponding to the standard atomic poses; and
in response to a case in which the hash value of the atomic pose is identical to one of the hash values in the hash table which are respectively corresponding to the standard atomic poses, determining that the atomic pose conforms to one of the standard atomic poses of the specific motion.

7. The method for motion recognition according to claim 1, wherein the step of recognizing that the live body performs the specific motion when it is determined, according to the hash value of the atomic pose, that the atomic pose conforms to one of the standard atomic poses of the specific motion comprises:
in response to a case in which all of the standard atomic poses respectively conform to the atomic pose in the video frame and the other atomic poses in the other video frames, determining that the live body performs the specific motion, wherein a video stream further comprises the video frame and the other video frames.

8. The method for motion recognition according to claim 7, wherein the method further comprises:
setting a sampling timer; and
in response to a case in which a video sampling period of the sampling timer expires, determining that the live body does not perform the specific motion.

9. A system for motion recognition based on an atomic pose, wherein the system comprises:
a storage apparatus; and
a processor, coupled to the storage apparatus and configured to execute an instruction in the storage apparatus to:
obtain a video frame comprising a live body;
analyze the live body in the video frame to generate an atomic pose feature value;
execute a hash function according to the atomic pose feature value to generate a hash value of the atomic pose; and
recognize that the live body performs a specific motion by comparing the hash value of the atomic pose with a hash table related to the specific motion,
wherein the processor is configured to:
analyze the live body in the video frame to generate limb angle information of the atomic pose; and
when it is determined, according to the hash value of the atomic pose, that the atomic pose conforms to one of a plurality of standard atomic poses of the specific motion, recognize that the live body performs the specific motion.

10. The system for motion recognition according to claim 9, wherein the processor is configured to:
analyze the live body to obtain skeletal information comprising a plurality of joint points;
obtain a plurality of limb vectors according to the specific motion and coordinate positions of the joint points; and
calculate joint included angles according to the specific motion and the limb vectors.

11. The system for motion recognition according to claim 10, wherein the processor is configured to:
adjust the joint included angles according to a tolerance value; and
input the joint included angles of the atomic pose into the hash function to generate the hash value of the atomic pose.

12. The system for motion recognition according to claim 11, wherein the processor is configured to:
in response to a case in which a difference between a first joint included angle of the joint included angles and a first standard joint included angle of a plurality of standard joint included angles is less than the tolerance value, adjust the first joint included angle to be identical to the first standard joint included angle.

13. The system for motion recognition according to claim 9, wherein the processor is configured to:
define a plurality of standard joint included angles of the standard atomic poses of the specific motion according to the specific motion;

perform the hash function according to the standard joint included angles to generate hash values of the standard atomic poses; and create the hash table of the specific motion according to the hash values of the standard atomic poses.

14. The system for motion recognition according to claim 13, wherein the processor is configured to:

search the hash table according to the hash value of the atomic pose, to determine whether the hash value of the atomic pose is identical to one of the hash values in the hash table that are respectively corresponding to the standard atomic poses; and in response to a case in which the hash value of the atomic pose is identical to one of the hash values in the hash table which are respectively corresponding to the standard atomic poses, determine that the atomic pose conforms to one of the standard atomic poses of the specific motion.

15. The system for motion recognition according to claim 9, wherein the processor is configured to:

in response to a case in which all of the standard atomic poses respectively conform to the atomic pose in the video frame and the other atomic poses in other video frames, determine that the live body performs the specific motion, wherein the video stream further comprises the video frame and the other video frames.

16. The system for motion recognition according to claim 15, wherein the processor is configured to:

set a sampling timer; and in response to a case in which a video sampling period of the sampling timer expires, determine that the live body does not perform the specific motion.

17. A non-transitory computer-accessible recording medium recording a computer program and loaded by a processor of a system for motion recognition to perform the following steps:

obtaining a video frame comprising a live body;

analyzing the live body in the video frame to generate an atomic pose feature value;

executing a hash function according to the atomic pose feature value to generate a hash value of an atomic pose; and recognizing that the live body performs a specific motion by comparing the hash value of the atomic pose with a hash table related to the specific motion, wherein the step of analyzing the live body in the video frame to generate the atomic pose feature value comprises:

analyzing the live body in the video frame to generate limb angle information of the atomic pose, wherein the step of recognizing that the live body preforms the specific motion by comparing the hash value of the atomic pose comprises:

recognizing that the live body performs the specific motion when it is determined, according to the hash value of the atomic pose, that the atomic pose conforms to one of a plurality of standard atomic poses of the specific motion.

* * * * *